United States Patent
Katada et al.

(10) Patent No.: US 12,205,289 B2
(45) Date of Patent: Jan. 21, 2025

(54) MEDICAL INFORMATION PROCESSING METHOD, MEDICAL INFORMATION PROCESSING APPARATUS, AND MEDICAL IMAGE PROCESSING APPARATUS

(71) Applicants: Fujita Academy, Toyoake (JP); Canon Medical Systems Corporation, Otawara (JP)

(72) Inventors: Kazuhiro Katada, Toyoake (JP); Satoru Nakanishi, Utsunomiya (JP)

(73) Assignees: Fujita Academy, Toyoake (JP); Canon Medical Systems Corporation, Otawara (JP)

( * ) Notice: Subject to any disclaimer, the term of this patent is extended or adjusted under 35 U.S.C. 154(b) by 399 days.

(21) Appl. No.: 17/664,312

(22) Filed: May 20, 2022

(65) Prior Publication Data

US 2022/0375086 A1  Nov. 24, 2022

(30) Foreign Application Priority Data

May 21, 2021 (JP) .................. 2021-085933

(51) Int. Cl.
*G06T 7/00* (2017.01)
*G06T 5/70* (2024.01)
(Continued)

(52) U.S. Cl.
CPC .............. *G06T 7/0014* (2013.01); *G06T 5/70* (2024.01); *G06T 5/90* (2024.01); *G06V 10/774* (2022.01);
(Continued)

(58) Field of Classification Search
None
See application file for complete search history.

(56) References Cited

U.S. PATENT DOCUMENTS 10,346,974 B2  7/2019  Sloan et al.
10,949,951 B2  3/2021  Tang et al.
(Continued)

FOREIGN PATENT DOCUMENTS

EP  3 600 026 A1  2/2020
JP  2016-504167 A  2/2016
(Continued)

OTHER PUBLICATIONS

Han, X., "MR-based synthetic CT generation using a deep convolutional neural network method", American Association of Physicists in Medicine, 44(4) 2017, 13 pages.
(Continued)

*Primary Examiner* — Darryl V Dottin
(74) *Attorney, Agent, or Firm* — Oblon, McClelland, Maier & Neustadt, L.L.P.

(57) ABSTRACT

According to one embodiment, a medical information processing method generates a high-contrast image by applying conversion processing to a first medical image captured by a first diagnostic apparatus and having a first contrast in a region of interest, the high-contrast image having a contrast higher than a contrast of a second medical image obtained by a second diagnostic apparatus. The method generates a pseudo second medical image by applying image processing to the high-contrast image, the pseudo second medical image simulating the second medical image and having a second contrast lower than the first contrast. The method trains a model using the pseudo second medical image as input data and the high-contrast image as ground truth data, and generates a trained model.

12 Claims, 5 Drawing Sheets

(51) Int. Cl.
*G06T 5/90* (2024.01)
*G06V 10/774* (2022.01)

(52) U.S. Cl.
CPC ............... *G06T 2207/10081* (2013.01); *G06T 2207/10096* (2013.01); *G06T 2207/10104* (2013.01); *G06T 2207/20081* (2013.01); *G06T 2207/20182* (2013.01)

(56) References Cited

U.S. PATENT DOCUMENTS

| | | | |
|---|---|---|---|
| 2003/0095692 A1* | 5/2003 | Mundy | G06T 7/0012 382/128 |
| 2014/0212013 A1 | 7/2014 | Han | |
| 2018/0336677 A1 | 11/2018 | Sloan et al. | |
| 2019/0213442 A1* | 7/2019 | Singh | G06T 7/593 |
| 2020/0065940 A1 | 2/2020 | Tang et al. | |
| 2020/0211209 A1 | 7/2020 | Liao et al. | |
| 2021/0158526 A1* | 5/2021 | Patil | G06N 3/08 |

FOREIGN PATENT DOCUMENTS

| | | |
|---|---|---|
| JP | 2018-192264 A | 12/2018 |
| JP | 2019-209014 A | 12/2019 |
| JP | 2020-64609 A | 4/2020 |
| JP | 2021-058563 A | 4/2021 |
| WO | WO 2018/183044 A1 | 10/2018 |

OTHER PUBLICATIONS

Kida, S., "Image diagnosis support AI development for Japanese companies 2018 ③ ~ Canon Medical ~", Imacel Academy, 2018, 7 pages (with Machine Generated English Translation).

Extended European Search Report issued Oct. 28, 2022, in corresponding European Patent Application No. 22174657.1, 10 pages.

Avi Ben-Cohen et al., "Cross-Modality Synthesis from CT to PET using FCN and GAN Networks for Improved Automated Lesion Detection", arxiv.org, Cornell University Library1 201 Olin Library Cornell University Ithaca, NY 14853, Feb. 22, 2018, XP81217555, 9 pages.

Office Action issued on Nov. 26, 2024, in corresponding Japanese Patent Application No. 2021-085933, 3 pages total.

* cited by examiner

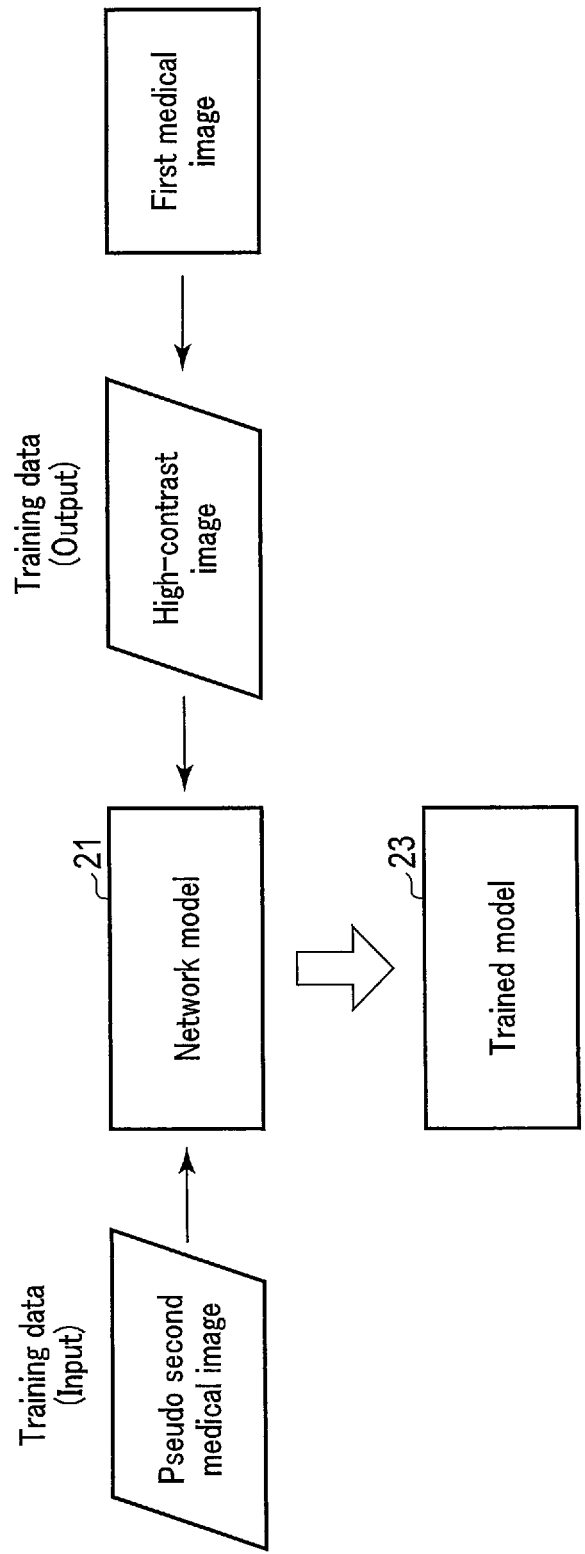
F I G. 2

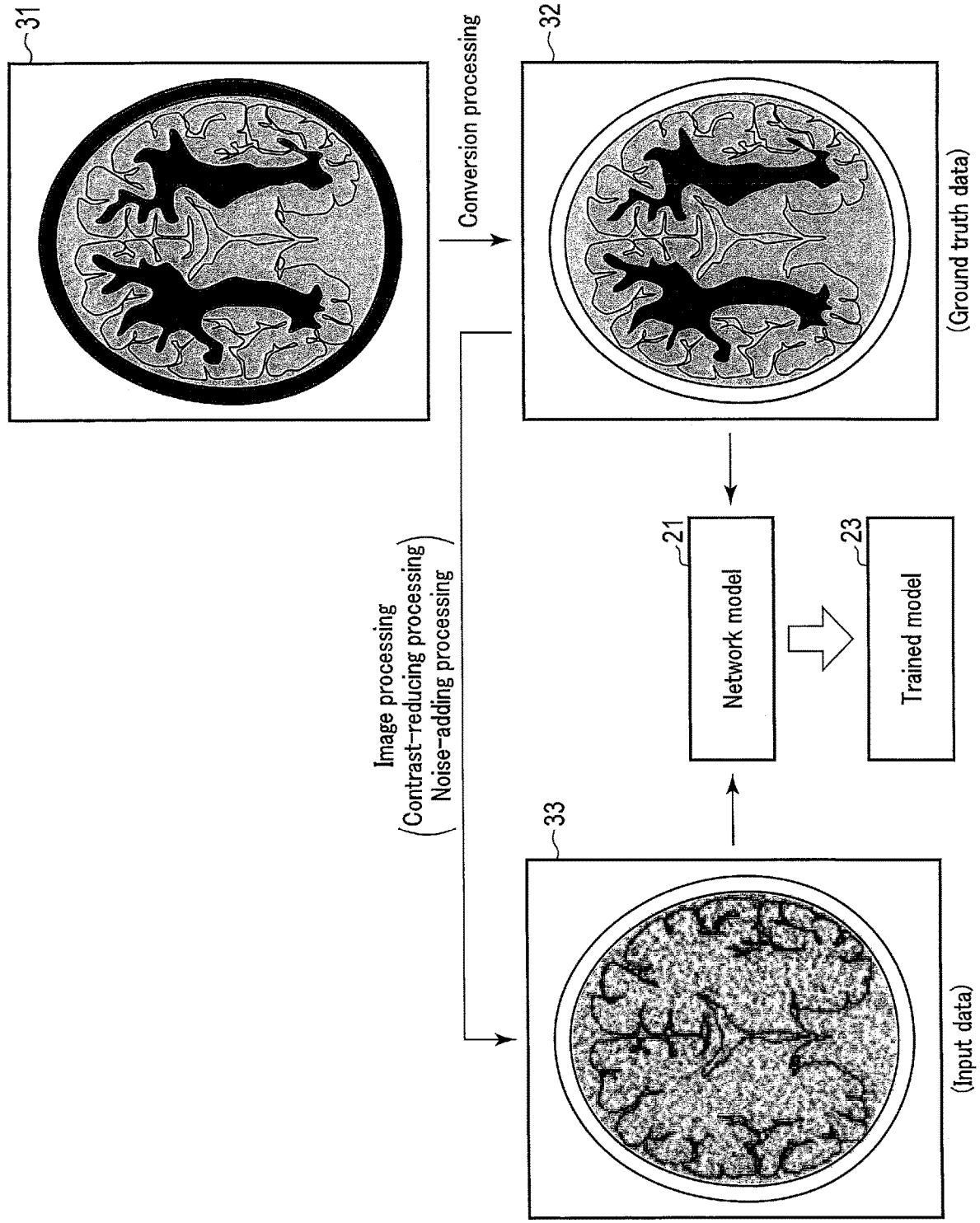
F I G. 3

MEDICAL INFORMATION PROCESSING METHOD, MEDICAL INFORMATION PROCESSING APPARATUS, AND MEDICAL IMAGE PROCESSING APPARATUS

CROSS-REFERENCE TO RELATED APPLICATIONS

This application is based upon and claims the benefit of priority from Japanese Patent Application No. 2021-085933, filed May 21, 2021, the entire contents of which are incorporated herein by reference.

FIELD

Embodiments described herein relate generally to a medical information processing method, a medical information processing apparatus, and a medical image processing apparatus.

BACKGROUND

Diagnostic using a computed tomography (CT) image and a magnetic resonance (MR) image has been widely used for medical image diagnostic of a brain tissue. In this respect, although the contrast between the white matter and the gray matter of the brain shown in a CT image has been improved through image processing such as noise reduction and contrast enhancement processing, the contrast in a CT image is not as good as the contrast in an MR image. Particularly at an emergency site and the like, there is a higher need for performing image capturing using an X-ray CT apparatus, which can capture an image in a short time, than for performing image capturing using an MRI apparatus, which cannot capture an image when imaging requires time and metal is embedded in a patient.

BRIEF DESCRIPTION OF THE DRAWINGS

FIG. 2 is a diagram showing a concept of training a model through a model training function according to the first embodiment.

FIG. 3 is a diagram showing a specific example of training a model through the model training function according to the first embodiment.

DETAILED DESCRIPTION

Figure 1:
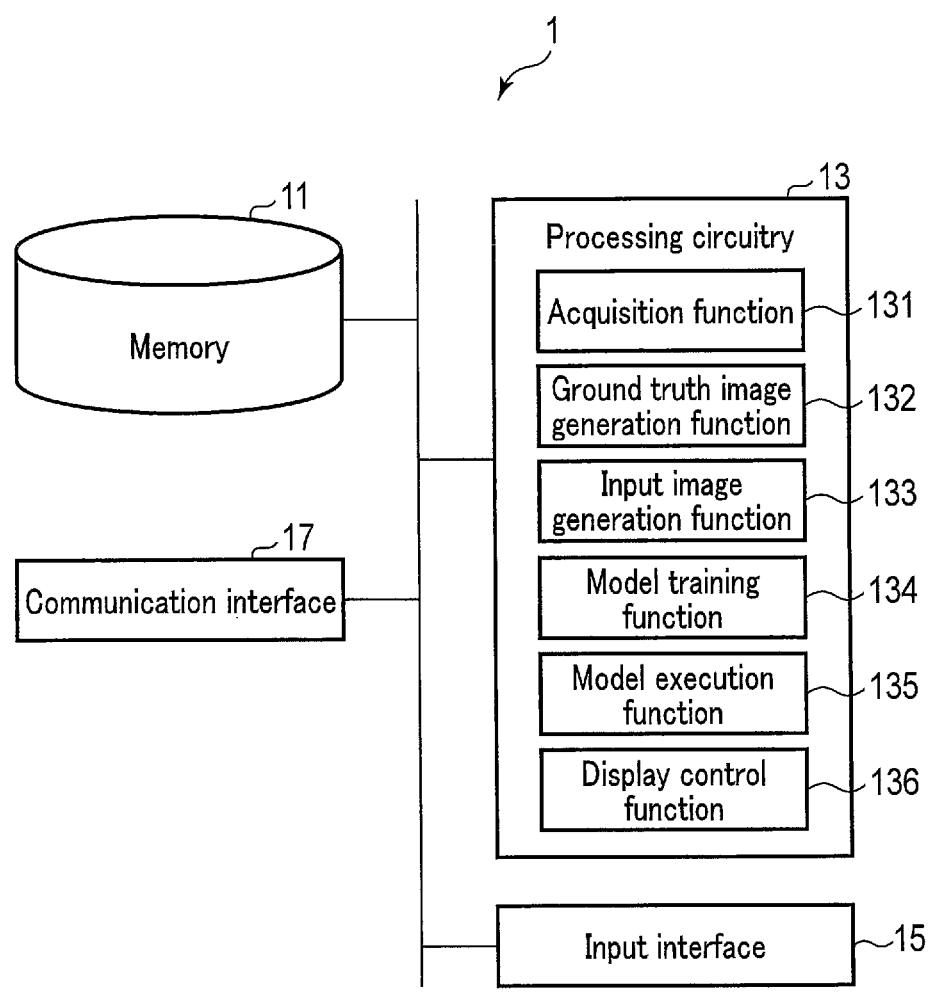
FIG. 1 is a block diagram showing a medical information processing apparatus according to a first embodiment.

In general, according to one embodiment, a medical information processing method generates a high-contrast image by applying conversion processing to a first medical image, the first medical image being captured by a first medical image diagnostic apparatus and having a first contrast in a region of interest, the high-contrast image having a contrast higher than a contrast of a second medical image obtained by a second medical image diagnostic apparatus. The method generates a pseudo second medical image by applying image processing to the high-contrast image, the pseudo second medical image simulating the second medical image and having a second contrast lower than the first contrast in the region of interest. The trains a model using the pseudo second medical image as input data and the high-contrast image as ground truth data, and generating a trained model.

Hereinafter, a medical information processing method, a medical information processing apparatus, and a medical image processing apparatus according to the present embodiment will be described with reference to the accompanying drawings. In the embodiments described below, elements assigned the same reference numerals perform the same operations, and redundant descriptions will be omitted as appropriate. An embodiment will be described below with reference to the drawings.

First Embodiment

A medical information processing apparatus according to a first embodiment will be described with reference to the block diagram shown in FIG. 1.

A medical information processing apparatus 1 according to the first embodiment includes a memory 11, processing circuitry 13, an input interface 15, and a communication interface 17.

The memory 11 is a storage device, such as a hard disk drive (HDD), a solid state drive (SSD), or an integrated circuit storage device, which stores various types of information. The memory 11 may not only be the HDD, the SSD, or the like, but may also be a drive unit that writes and reads various types of information to and from a portable storage medium such as a compact disc (CD), a digital versatile disc (DVD), or a flash memory, or a semiconductor memory element such as a random access memory (RAM). The storage area of the memory 11 may be in the medical information processing apparatus 1, or in an external storage device connected via a network. The memory 11 is assumed to store training data, a trained model, various medical data (e.g., intermediate data such as raw data, projection data, and a sinogram), various medical images (such as a reconstruction image, a computed tomography (CT) image, a magnetic resonance (MR) image, an ultrasonic image, a positron emission tomography (PET) image, and a single photon emission computed tomography (SPECT) image). The training data, trained model, medical data, medical image, and the like may be stored in an external device. When the training data, trained model, medical data, medical image, and the like are stored in an external device, it suffices so long as the processing circuitry 13 can be referred to.

For example, the processing circuitry 13 includes, as hardware resources, processors such as a central processing unit (CPU), a micro processing unit (MPU), and a graphics processing unit (GPU), and memories such as a read-only-memory (ROM) and a random-access-memory (RAM). The processing circuitry 13 may be implemented by an application specific integrated circuit (ASIC), a field programmable gate array (FPGA), other complex programmable logic device (CPLD), or a simple programmable logic device (SPLD).

Through a processor that executes a program loaded into the memory, the processing circuitry 13 implements an acquisition function 131, a ground truth image generation function 132, an input image generation function 133, a model training function 134, a model execution function 135, and a display control function 136. The respective functions (acquisition function 131, ground truth image generation function 132, input image generation function 133, model training function 134, model execution function 135, and display control function 136) are not necessarily implemented by single processing circuitry. The processing circuitry 13 may be configured by combining a plurality of independent processors, which execute respective programs to implement the respective functions.

Through the acquisition function 131, the processing circuitry 13 acquires a first medical image captured by a first medical image diagnostic apparatus and having a first contrast in a region of interest. In other words, the first medical image is a medical image obtained by a first imaging modality, which is an imaging method used by the first medical image diagnostic apparatus. The first contrast is a contrast between tissues in a region of interest shown in the first medical image.

Through the ground truth image generation function 132, the processing circuitry 13 generates a high-contrast image having a higher contrast than that of a second medical image obtained by a second medical image diagnostic apparatus, by applying conversion processing to the first medical image. In other words, the second medical image is obtained by applying, to the first medical image, the conversion processing of converting the image obtained by the first imaging modality into an image corresponding to a second imaging modality, which is an imaging method used by the second medical image diagnostic apparatus. The ground truth image generation function 132 is an example of a first generator. The second medical image diagnostic apparatus is assumed to be an apparatus that can capture a medical image having a higher contrast between tissues in a region of interest than the first medical image diagnostic apparatus can.

Through the input image generation function 133, the processing circuitry 13 generates a pseudo second medical image, which simulates the second medical image and has a second contrast lower than that of the first contrast in the region of interest, by applying image processing to a high-contrast image.

The image processing is assumed to be processing that reduces (degrades) at least an image contrast, such as contrast-reducing processing and noise-adding processing.

Through the model training function 134, the processing circuitry 13 trains a network model using the pseudo second medical image as input data and using the high-contrast image as ground truth data, and thereby generates a trained model. The trained model thus generated can improve the contrast in the image obtained by the second imaging modality. The network model that is assumed to be used in the present embodiment is a neural network, a deep neural network, a deep convolutional neural network (DCNN), or the like. The model is not limited thereto, and may be any model as long as it can learn some features from the training data.

Through the model execution function 135, the processing circuitry 13 applies the trained model to the second medical image obtained from the second medical image diagnostic apparatus, and outputs a high-contrast image which is the second medical image with an enhanced contrast. If the trained model is stored in the memory 11, for example, the trained model may be referred to from the memory 11, and if the trained model is stored in an external device, the model execution function 135 may refer to the external device.

Through the display control function 136, the processing circuitry 13 controls output of an image so as to display the high-contrast image on a display, or display the high-contrast image on a screen or the like via a projector.

The input interface 15 receives various input operations from a user, and outputs signals that are based on the received input operations to the memory 11, the processing circuitry 13, the communication interface 17, and the like. For example, a mouse, a keyboard, a trackball, a switch, a button, a joystick, a touch pad, a touch panel display, etc., can be used as appropriate. In the present embodiment, the input interface 15 does not necessarily include physical operation components such as a mouse, a keyboard, a trackball, a switch, a button, a joystick, a touch pad, and a touch panel display. Examples of the input interface 15 also include processing circuitry that receives a signal corresponding to an input operation from an external input device separate from its own apparatus, and outputs this signal to the processing circuitry 13.

The communication interface 17 is a wireless or wired interface for communicating with an external device, and a general interface may be employed; thus, description of the communication interface 17 is omitted.

A configuration that includes the memory 11, the processing circuitry 13 including the acquisition function 131, the model execution function 135, the display control function 136, the input interface 15, and the communication interface 17 is also referred to as a medical image processing apparatus.

The medical information processing apparatus 1 and the medical image processing apparatus according to the first embodiment may be installed in a computer such as a workstation having a general-purpose processor, such as a CPU or a GPU, or a processor configured exclusively for machine learning, or may be mounted in a server such as a PACS. Alternatively, the medical information processing apparatus 1 and the medical image processing apparatus according to the first embodiment may be installed in various medical image diagnostic apparatuses such as a CT apparatus.

The processing described above may be implemented by executing the above functions (acquisition function 131, ground truth image generation function 132, input image generation function 133, model training function 134, model execution function 135, and display control function 136) respectively in separate apparatuses and connecting the respective apparatuses so that they can communicate with each other.

Next, a concept of training a model through the model training function 134 will be described with reference to FIG. 2. When training a model, training data is used to train a network model 21.

As shown in FIG. 2, training data comprised of the high-contrast image generated from the first medical image as ground truth data (correct data) and the pseudo second medical image generated from the high-contrast image as input data is used to train the network model 21 and generate a trained model 23.

Next, a specific example of training a model through the model training function 134 will be described with reference to FIG. 3.

FIG. 3 is a conceptual diagram showing, as a specific example of training a network model, the case where training data related to an MR image of the head of a subject is used to generate a trained model. In this instance, the first medical image diagnostic apparatus is assumed to be an MRI apparatus, and the second medical image diagnostic apparatus is assumed to be an X-ray CT apparatus. The first medical image is an MR image, and the pseudo second medical image is a pseudo CT image.

An MR image 31 is an MR image in which a region including the white matter and the gray matter of the brain is set as a region of interest, and is assumed to be an image having a high contrast between the tissues of the white matter and the gray matter, such as a fluid attenuated inversion recovery (FLAIR) image.

Through the processing of converting an MR image to a CT image, a high-contrast CT image 32 is generated which simulates a CT image but has a higher contrast than that of a general CT image while maintaining the contrast of the MR image 31 to a certain degree. General image conversion processing may be adopted as the processing of image conversion between medical images captured by different medical image diagnostic apparatuses, such as conversion from an MR image to a CT image. Namely, any method may be adopted as long as it is an image conversion that allows for conversion to an image equivalent to an image captured by a different imaging modality, which is a different imaging method.

The high-contrast CT image 32 has a lower contrast for the region of the white matter and the gray matter than that of the MR image 31. On the other hand, the high-contrast CT image 32 is assumed to have a higher contrast than that of the CT image actually captured by the X-ray CT apparatus. The shapes of the anatomical structures shown in the high-contrast CT image 32 and the MR image 31 are approximately the same.

The pseudo CT image 33 is generated by subjecting the high-contrast CT image 32 to image processing. Namely, since a general CT image has a lower contrast between the white matter and the gray matter than that of an MR image, the high-contrast CT image 32 simulating a CT image is subjected to image processing so that it will be closer to an actual CT image. Specifically, through the input image generation function 133, the processing circuitry 13 performs contrast-reducing processing and noise-adding processing on the high-contrast CT image 32. To implement the contrast-reducing processing, for example, filter processing may be performed so that the contrast in the entire image will be reduced. To implement the noise-adding processing, for example, processing of adding noise may be performed so that granular noise specific to a CT image will be included.

As described above, a plurality of training data employing the pseudo CT image 33 and the high-contrast CT image 32 in pairs are prepared and stored, for example, in the memory 11. Through the model training function 134, the processing circuitry 13 repetitively trains the network model 21 using the pseudo CT image 33 as input data and using the high-contrast CT image 32 as ground truth data, whereby a trained model is generated. As a learning method for the network model 21, a training method adopted in general machine learning may be adopted, in which an error between the output image from the network model 21 and the high-contrast CT image 32 as ground truth data is calculated, and parameters of a network model are learned using an error backpropagation method so that an error function related to the error will be minimal.

This allows for training of the network model 21 so that a high-contrast CT image having a contrast between tissues in a region of interest comparable to the contrast of an MR image will be reproduced from a CT image.

As long as the MR images 31 are collected, the images can be easily converted to the high-contrast CT image 32 and the pseudo CT image 33. Since an MR image and a CT image corresponding thereto need not be collected in pairs, training data can be easily and efficiently prepared.

Also, when generating the high-contrast CT image 32 and the pseudo CT image 33 from the MR image 31, an image assuming an image obtained by performing multiple types of image reconstruction processing may be generated and used as training data. Examples of the image reconstruction method include image reconstruction processing using a filtered back projection (FBP) method, an iterative reconstruction method, and the like, and when the trained model is utilized, it is unclear what type of image reconstruction processing is used to input CT images.

Thus, to be able to cope with various types of image reconstruction processing, the processing circuitry 13, for example, generates, through the input image generation function 133 and from a single high-contrast CT image 32, a pseudo CT image 33 assuming an image obtained by performing image reconstruction through the FBP method and a pseudo CT image 33 assuming an image obtained by performing image reconstruction through the iterative reconstruction method. For example, the pseudo CT image 33 obtained by the iterative reconstruction method has different noise patterns, such as a noise amount and a noise type, from those of the pseudo CT image 33 obtained by the FBP method. An iterative-reconstructed pseudo CT image 33 can be generated by adding a noise pattern for iterative reconstruction to the high-contrast CT image 32, and an FBP-reconstructed pseudo CT image 33 can be generated by adding a noise pattern for FBP reconstruction to the high-contrast CT image 32.

In this manner, generating pseudo CT images 33 assuming images obtained by performing multiple types of image reconstruction processing allows for generation of a more versatile trained model 23.

The MR image 31 as a source of ground truth data may include not only MR images of specific types of diseases but also MR images of various cases and MR images of normal conditions of healthy people. This makes it possible to prepare varied training data and generate a more versatile trained model 23.

Figure 4:
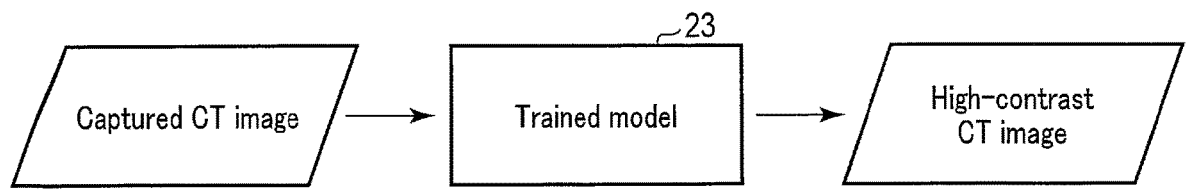
FIG. 4 is a diagram showing a concept of utilizing a trained model through a model execution function according to the first embodiment.

Next, the concept of utilizing the trained model 23 will be described with reference to FIG. 4.

When utilizing the trained model 23, the trained model 23 is applied to a CT image actually captured by an X-ray CT apparatus. Namely, through the model execution function 135, the processing circuitry 13 inputs an actually captured CT image to the trained model 23, whereby a high-contrast CT image, which is a CT image having an enhanced contrast, is output from the trained model 23.

As the high-contrast image, a contrast-enhanced image obtained by performing contrast enhancing processing on a CT image captured by an X-ray CT apparatus at a high tube current value (mAs) may be used. Since the contrast enhancing processing effectively acts on a CT image captured at a high tube current value, training data that adopts the contrast-enhanced image as ground truth data and the captured CT image as input data may also be used.

In the above-described example, the head is assumed as an imaging target site; however, the embodiment is not limited thereto. An abdomen, a spinal cord, the four limbs, joints, and the like may also be adopted as imaging target sites. It is more practical to adopt as the area to be imaged an area where images with higher contrast between tissues are more significant.

If a plurality of imaging target sites are assumed, a trained model is generated for each imaging target site. For example, if the head is the imaging target site, training data including a high-contrast image generated from an MR image related to the head and a pseudo CT image corresponding thereto may be used to generate a trained model. If the abdomen is the imaging target site, training data including a high-contrast image generated from an MR image related to the abdomen and a pseudo CT image corresponding thereto may be used to generate a trained model.

Also, a high-contrast image is not necessarily generated based on an MR image but may be generated based on a PET image acquired by a PET apparatus. A PET image is utilized to diagnose whether or not there is a tumor as well as whether the tumor is benign or malignant by measuring the sugar metabolism of the tissue using a substance similar to glucose such as $^{18}$F-FDG (fluorodeoxyglucose). Since a PET image shows a higher contrast of a tumor than that of a CT image, generating a high-contrast image (e.g., a fusion image composed of a PET image and a CT image superposed on each other) from a PET image with the tumor site set as a region of interest and generating a pseudo CT image corresponding to the high-contrast image to use them as training data can generate a trained model in the same manner as in the case of using the MR image. A fusion image having an enhanced contrast related to a tumor can be generated by applying the trained model to a captured CT image.

A PET image is not necessarily used, and a SPECT image acquired by a SPECT apparatus may be used.

According to the first embodiment described above, a high-contrast image having a higher contrast than that of a second medical image is generated from a first medical image having a high contrast and subjected to image processing, to thereby generate a pseudo second medical image which simulates the second medical image and has a lower contrast than that of the high-contrast image. A model is trained using the pseudo second medical image as input data and the high-contrast image as ground truth data, to thereby generate a trained model. The trained model is applied to an actually captured second medical image, to thereby generate a medical image having an enhanced contrast as compared to the second medical image.

Second Embodiment

In a second embodiment, an X-ray CT apparatus will be described as an example of a medical image diagnostic apparatus including the functions of the processing circuitry 13 of the medical image processing apparatus of the first embodiment.

Figure 5:
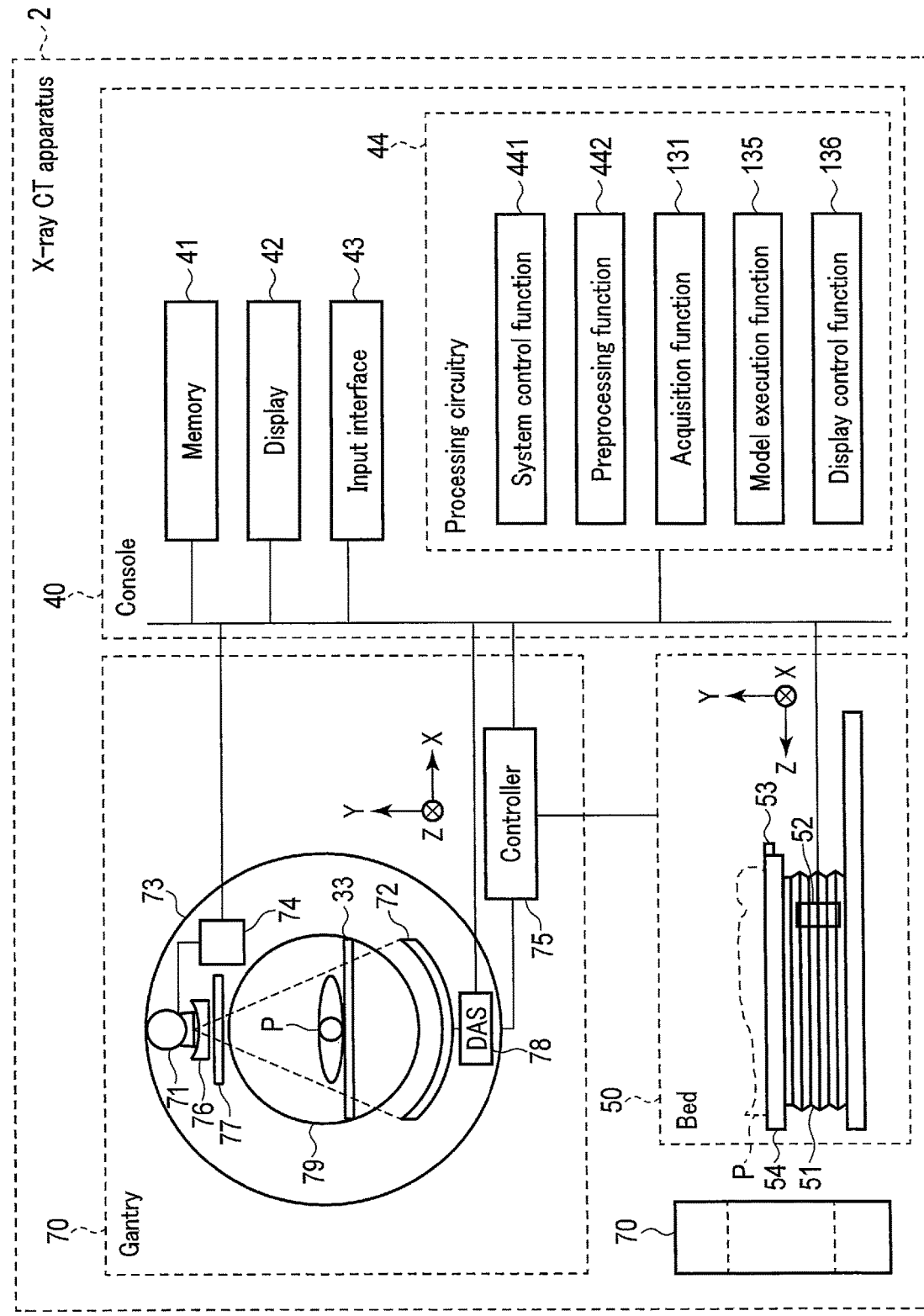
FIG. 5 is a block diagram showing a configuration of an X-ray CT apparatus, which is an example of a medical image diagnostic apparatus according to a second embodiment.

An X-ray CT apparatus according to the present embodiment will be described with reference to the block diagram shown in FIG. 5. An X-ray CT apparatus 2 shown in FIG. 5 includes a gantry 70, a bed 50, and a console 40 that implements the processing of the X-ray CT apparatus. For the sake of explanation, FIG. 5 shows multiple gantries 70.

The X-ray CT apparatus 2 and a control method according to the present embodiment will be described using a supine-type X-ray CT apparatus as an example; however, it may also be applied to a standing-type X-ray CT apparatus. The X-ray CT apparatus 2 and the control method according to the present embodiment may also be applied to an X-ray CT apparatus that can scan a subject both when in a standing posture and when in a lying posture according to a scan mode.

In the present embodiment, the longitudinal direction of the rotation axis of a rotary frame 73 in a non-tilted state is defined as a Z-axis, the direction orthogonal to the Z-axis and extending from the rotation center to the support supporting the rotary frame 73 is defined as an X-axis, and the direction orthogonal to the Z-axis and the X-axis is defined as a Y-axis.

For example, the gantry 70 and the bed 50 are arranged in a CT examination room, and the console 40 is arranged in a control room adjacent to the CT examination room. The console 40 need not necessarily be arranged in the control room. For example, the console 40 may be arranged together with the gantry 70 and the bed 50 in the same room. In any case, the gantry 70, the bed 50, and the console 40 are communicably connected to one another by wire or radio.

The gantry 70 is a scanner that has a configuration for performing X-ray CT imaging on a subject P. The gantry 70 includes an X-ray tube 71, an X-ray detector 72, a rotary frame 73, an X-ray high-voltage device 74, a controller 75, a wedge 76, a collimator 77, and a data acquisition system 78 (hereinafter also referred to as "DAS 78").

The X-ray tube 71 is a vacuum tube that generates X-rays by emitting thermal electrons from a cathode (filament) toward an anode (target) through a high-voltage application and a filament current supply from the X-ray high-voltage device 74. Specifically, X-rays are generated through collision of the thermal electrons with the target. Examples of the X-ray tube 71 include a rotating anode-type X-ray tube that generates X-rays by emitting thermal electrons to the rotating anode. The X-rays generated by the X-ray tube 71 are, for example, formed into a cone-beam shape through the collimator 77, and applied to the subject P.

The X-ray detector 72 detects X-rays that have been radiated from the X-ray tube 71 and have passed through the subject P. The X-ray detector 72 includes, for example, multiple rows of X-ray detecting elements, each row including multiple X-ray detecting elements arranged in the channel direction and along a single arc having a center at the focal point of the X-ray tube 71. For example, the X-ray detector 72 has an array structure in which multiple rows of X-ray detecting elements, each row including multiple X-ray detecting elements arranged in the channel direction, are arranged in the slice direction (row direction).

Specifically, the X-ray detector 72 is, for example, an indirect conversion-type detector including a grid, a scintillator array, and an optical sensor array. The X-ray detector 72 can be assumed as both a general integrating detector and a photon-counting detector. The X-ray detector 72 is an example of a detector.

A case where the X-ray detector 72 is an integrating detector will be described.

The scintillator array includes a plurality of scintillators. The scintillator has a scintillator crystal that outputs light having a photon quantity corresponding to the dose of the incident X-ray.

The grid is arranged on the face of the scintillator array on the X-ray incident side, and includes an X-ray shielding plate that functions to absorb scattered X-rays. The grid may also be referred to as a collimator (one-dimensional collimator or two-dimensional collimator).

The optical sensor array has the function of amplifying the light received from the scintillator and converting the amplified light into an electric signal, and includes an optical sensor such as a photomultiplier (PMT).

A case where the X-ray detector 72 is a photon counting detector will be described next.

The scintillator converts the incident X-rays into photons, the number of which corresponds to the intensity of the incident X-rays. The optical sensor array has the function of amplifying the light received from the scintillator and converting the amplified light into an electric signal, to generate an output signal (energy signal) having a peak value corresponding to the energy of the incident X-rays.

The X-ray detector 72 may be a direct conversion-type detector with a semiconductor element that converts incident X-rays into an electric signal.

The rotary frame 73 is an annular frame that supports the X-ray tube 71 and the X-ray detector 72 in such a manner that the X-ray tube 71 and the X-ray detector 72 face each other, and rotates the X-ray tube 71 and the X-ray detector 72 under the control of a controller 75 (described later). In addition to the X-ray tube 71 and the X-ray detector 72, the rotary frame 73 further carries and supports the X-ray high-voltage device 74 and the DAS 78.

The rotary frame 73 is rotatably supported by a stationary frame (not shown) made of a metal such as aluminum. More specifically, the rotary frame 73 is connected to the edge of the stationary frame via a bearing. The rotary frame 73 receives power from a drive mechanism of the controller 75 to rotate about the rotational axis Z at a constant angular velocity.

The rotary frame 73 is rotatably supported by a non-rotating part of the gantry (such as a stationary frame, not shown in FIG. 1). A rotation mechanism includes, for example, a motor that generates rotational drive force and a bearing that transmits the rotational drive force to the rotary frame 73 to rotate the rotary frame 73. The motor is, for example, provided to the non-rotating part, and the bearing is physically connected to the rotary frame 73 and the motor, so that the rotary frame rotates according to the rotational force of the motor.

Non-contact or contact-type communication circuitry is provided to each of the rotary frame 73 and the non-rotating part, whereby the units supported by the rotary frame 73 communicate with the non-rotating part or an apparatus outside the gantry 70. For example, when optical communication is adopted as a non-contact communication method, detection data generated by the DAS 78 is transmitted, through optical communication, from a transmitter with a light-emitting diode (LED), which is arranged in the rotary frame 73, to a receiver with a photodiode, which is arranged in the non-rotating part of the gantry, and further transferred from the non-rotating part to the console 40 by the transmitter. As the communication method, not only the aforementioned communication method but also a non-contact data transmission method such as a capacitive coupling method and a radio wave method, and a contact-type data transmission method using a slip ring and an electrode brush may be adopted.

The X-ray high-voltage device 74 includes a high-voltage generator and an X-ray controller. The high-voltage generator includes electric circuitry such as a transformer and a rectifier, and has a function to generate a high voltage to be applied to the X-ray tube 71 and a filament current to be supplied to the X-ray tube 71. The X-ray controller is configured to control output voltages in accordance with the X-rays to be radiated by the X-ray tube 71. The high-voltage generator may adopt a transformer system or an inverter system. The X-ray high-voltage device 74 may be provided in the rotary frame 73 (described later), or in the stationary frame (not shown) of the gantry 70.

The controller 75 includes processing circuitry having a CPU, etc., and a drive mechanism such as a motor or an actuator. The processing circuitry includes, as hardware resources, a processor such as a CPU or an MPU and a memory such as a ROM or a RAM. The controller 75 may be implemented by an ASIC, an FPGA, a CPLD, or an SPLD. The controller 75 controls the X-ray high-voltage device 74, the DAS 78, etc., according to commands given from the console 40. The processor implements the aforementioned control by reading and executing a program stored in the memory.

The controller 75 also has a function to control operations of the gantry 70 and the bed 50, in response to an input signal from an input interface 43 (described later) that is arranged in the console 40 or the gantry 70. For example, the controller 75 performs control to rotate the rotary frame 73, control to tilt the gantry 70, and control to operate the bed 50 and a top plate 53, upon receipt of the input signal. The control to tilt the gantry 70 is implemented by the controller 75 rotating the rotary frame 73 around an axis parallel to the X-axis direction based on tilt angle information input by the input interface 43 arranged in the gantry 70. The controller 75 may be provided in the gantry 70 or in the console 40. The controller 75 may be configured so that programs are directly incorporated in the circuitry of the processor, instead of being stored in the memory. In this case, the processor reads the programs incorporated in its circuitry and executes them to thereby implement the control.

The wedge 76 is a filter for adjusting the dose of X-rays radiated from the X-ray tube 71. Specifically, the wedge 76 is a filter that allows X-rays radiated from the X-ray tube 71 to pass therethrough and attenuates the X-rays so that the X-rays radiated from the X-ray tube 71 to the subject P exhibit a predetermined distribution. For example, the wedge 76 (wedge filter, bow-tie filter) is a filter obtained by processing aluminum to have a predetermined target angle and a predetermined thickness.

The collimator 77 is formed of diaphragm blades (also referred to as "blades") for narrowing down the irradiation range of the X-rays that have passed through the wedge 76. The collimator 77 forms a slit (also referred to as an "aperture") using a combination of the diaphragm blades. The diaphragm blades are formed of a material, such as a lead strip, that has a high ability to shield the X-rays. The collimator 77 may also be called an X-ray diaphragm.

When the X-ray detector 72 is an integrating detector, the DAS 78 reads an electric signal from the X-ray detector 72, and generates digital data (hereinafter also referred to as "detection data") related to a radiation dose of X-rays detected by the X-ray detector 72 based on the read electric signal. The detection data is a set of data indicating a channel number and a column number of the X-ray detection elements as a data generation source, a view number indicative of an acquired view (also referred to as a "projection angle"), and a value of an integral of the radiation dose of detected X-rays.

When the X-ray detector 72 is a photon-counting detector, the DAS 78 reads an energy signal from the X-ray detector 72 and generates detection data indicating a count of X-rays detected by the X-ray detector 72 based on the read energy signal for each energy band (energy bin). The detection data is a set of data indicating a channel number and a column number of the detector pixels as a data generation source, a view number indicative of an acquired view, and a count value identified by an energy bin number. The DAS 78 is implemented by, for example, an application specific integrated circuit (ASIC) equipped with a circuitry element capable of generating detection data.

The bed 50 is a unit for placing thereon and moving the subject P, which is a scan target, and includes a base 51, a bed drive 52, the aforementioned top plate 53, and a support frame 54.

The base 51 is a housing that supports the support frame 54 in such a manner that the support frame 54 can move vertically.

The bed drive 52 is a motor or an actuator that moves the top plate 53, on which the subject P is placed, in the longitudinal direction of the top plate 53. The bed drive 52 moves the top plate 53 under the control of the console 40 or the controller 75. For example, the bed drive 52 moves the top plate 53 in the direction orthogonal to the subject P so that the body axis of the subject P placed on the top plate 53 coincides with the central axis of the aperture of the rotary frame 73. The bed drive 52 may also move the top plate 53 along the body axis direction of the subject P in accordance with X-ray CT imaging executed using the gantry 70. The bed drive 52 generates power by being driven at a rotational rate corresponding to, for example, the duty ratio of a drive signal from the controller 75. The bed drive 52 is implemented by a motor such as a direct drive motor or a servo motor.

The top plate 53 on the top surface of the support frame 54 is a plate on which the subject P is placed. The bed drive 52 may move not only the top plate 53 but also the support frame 54 in the longitudinal direction of the top plate 53.

The console 40 includes a memory 41, a display 42, the aforementioned input interface 43, and processing circuitry 44. The memory 41, the display 42, the input interface 43, and the processing circuitry 44 perform data communications via a bus. The console 40 is described as a unit separate from the gantry 70; however, the console 40 or some of the components of the console 40 may be included in the gantry 70.

The memory 41 is a storage device, such as an HDD, an SSD or an integrated circuit storage device, that stores various types of information. The memory 41 stores, for example, a trained model for each imaging target site shown in the first embodiment, projection data (described later), and a reconstructed image data. The memory 41 may be not only an HDD, SSD or the like, but also a drive unit that writes and reads various types of information to and from, for example, a portable storage medium such as CD, DVD, or a flash memory, or a semiconductor memory device such as a RAM. The storage area of the memory 41 may be in the X-ray CT apparatus 2 or in an external storage device connected via a network. For example, the memory 41 stores data of CT images and display images. The memory 41 also stores a control program according to the present embodiment.

The display 42 displays various types of information. For example, the display 42 outputs a medical image (CT image) generated by the processing circuitry 44, a graphical user interface (GUI) for receiving various operations from the operator, and the like. For example, a liquid crystal display (LCD), a cathode ray tube (CRT) display, an organic electro luminescence display (OELD), a plasma display, or any other display may be suitably used as the display 42. The display 42 may be provided in the gantry 70. The display 42 may be of a desktop type or constituted by, for example, a tablet terminal capable of wireless communication with the main body of the console 40.

The input interface 43 receives various input operations from the operator, converts the received input operations into electric signals, and outputs the electric signals to the processing circuitry 44. For example, the input interface 43 receives, from an operator, acquisition conditions for acquiring imaging data, reconstruction conditions for reconstructing CT images, image-processing conditions for generating post-processed images from the CT images, and the like. For example, a mouse, a keyboard, a trackball, a switch, a button, a joystick, a touch pad, a touch-panel display, or the like may be suitably used as the input interface 43. In the present embodiment, the input interface 43 does not necessarily include physical operation components such as a mouse, a keyboard, a trackball, a switch, a button, a joystick, a touch pad, and a touch panel display. Examples of the input interface 43 also include processing circuitry for electric signals, which receives an electric signal corresponding to an input operation from an external input device separate from its own apparatus, and outputs this electric signal to the processing circuitry 44. The input interface 43 may be provided in the gantry 70. The input interface 43 may also be constituted by, for example, a tablet terminal capable of wireless communication with the main body of the console 40.

The processing circuitry 44 controls the entire operation of the X-ray CT apparatus 2 in accordance with the electric signal of the input operation output from the input interface 43. For example, the processing circuitry 44 includes, as hardware resources, a processor such as a CPU, an MPU, or a GPU, and a memory such as a ROM or a RAM. Through a processor that executes a program loaded into the memory, the processing circuitry 44, like the processing circuitry 13 according to the first embodiment, implements a system control function 441, a preprocessing function 442, the acquisition function 131, the model execution function 135, and the display control function 136. The respective functions are not necessarily implemented by single processing circuitry. The processing circuitry 13 may be configured by combining a plurality of independent processors, which execute respective programs to implement the respective functions. Since the acquisition function 131, the model execution function 135, and the display control function 136 perform the same operations as those described in the first embodiment, descriptions thereof will be omitted.

The system control function 441 controls each function of the processing circuitry 44 based on an input operation received from the operator via the input interface 43. Specifically, the system control function 441 reads a control program stored in the memory 41, loads it into the memory in the processing circuitry 44, and controls each unit of the X-ray CT apparatus 2 according to the loaded control program. For example, the processing circuitry 44 controls each function of the processing circuitry 44 based on an input operation received from the operator via the input interface 43. For example, the system control function 441 obtains a two-dimensional positioning image of the subject P to determine the scan range, imaging conditions, and the like.

The preprocessing function 442 generates data obtained by performing preprocessing, such as logarithmic conversion processing, offset correction processing, processing for sensitivity correction between channels, or beam hardening correction, on detection data output from the DAS 78. The data before preprocessing (detection data) and the data after preprocessing may also be collectively referred to as projection data.

The processing circuitry 44 also performs scan control processing, image processing, and display control processing.

The scan control processing controls various X-ray scan-related operations, such as causing the X-ray high-voltage device 74 to supply high voltages so that the X-ray tube 71 radiates X-rays.

The image processing is image reconstruction processing for converting CT image data into tomographic image data of any cross section or three-dimensional image data, based on an input operation received from the operator via the input interface 43.

The processing circuitry 44 need not necessarily be included in the console 40, and may be included in an integrated server which collectively performs processing on data obtained at a plurality of medical image diagnostic apparatuses.

The console 40 is described above as performing a plurality of functions with a single console; however, a plurality of functions may be performed by separate consoles. For example, the functions of the processing circuitry 44 such as the acquisition function 131 and the model execution function 135 may be distributed.

According to the second embodiment described above, a high-contrast image having a higher contrast in the region of interest than that of a CT image can be generated by applying a trained model to a CT image captured by the X-ray CT apparatus.

The X-ray CT apparatus 2 has various types such as a rotate/rotate-type (third generation CT) in which the X-ray tube and the detector integrally rotate around the subject P, and a stationary/rotate-type (fourth generation CT) in which many X-ray detection elements annularly arrayed are fixed and only the X-ray tube rotates around the subject P, all of which are applicable to the present embodiment.

Furthermore, the present embodiment may be applied to a single-tube type X-ray CT apparatus, and a so-called multi-tube type X-ray CT apparatus, in which multiple pairs of an X-ray tube and a detector are mounted on the rotating ring.

In addition, the functions described in the above embodiment may be implemented by installing programs for executing the processing in a computer, such as a workstation, and expanding the programs in a memory. The programs that can cause the computer to execute the processing can be stored in a storage medium, such as a magnetic disk (a hard disk, etc.), an optical disk (CD-ROM, DVD, etc.), or a semiconductor memory, and be distributed through it.

According to at least one of the embodiments described above, it is possible to generate a medical image having an enhanced contrast.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A medical information processing method comprising:
generating a high-contrast image by applying conversion processing to a first medical image, the first medical image being captured by a first medical image diagnostic apparatus and having a first contrast in a region of interest, the high-contrast image having a contrast higher than a contrast of a second medical image obtained by a second medical image diagnostic apparatus;
generating a pseudo second medical image by applying image processing to the high-contrast image, the pseudo second medical image simulating the second medical image and having a second contrast lower than the first contrast in the region of interest; and
training a model using the pseudo second medical image as input data and the high-contrast image as ground truth data, and generating a trained model.

2. The medical information processing method according to claim 1, wherein the first medical image is a magnetic resonance image or a positron emission tomography image, and the second medical image is a computed tomography image.

3. The medical information processing method according to claim 1, wherein the image processing is processing related to noise addition and contrast reduction performed on the high-contrast image.

4. The medical information processing method according to claim 1, wherein the high-contrast image and the pseudo second medical image are simulating images obtained by performing multiple types of image reconstruction processing.

5. The medical information processing method according to claim 1, wherein the first contrast and the second contrast are contrasts between tissues included in the region of interest.

6. A medical information processing method comprising:
applying conversion processing to a first medical image obtained by a first imaging modality and obtaining a second medical image used to train a machine learning model, the conversion processing converting an image obtained by the first imaging modality into an image corresponding a second imaging modality;
applying image processing to the second medical image and obtaining a third medical image having a contrast lower than a contrast of the second medical image and used to train the machine learning model; and
training the machine learning model based on the second medical image and the third medical image and generating a trained model for enhancing a contrast of an image obtained by the second image modality.

7. A medical image processing apparatus comprising processing circuitry configured to:
acquire a first medical image captured by a first medical image diagnostic apparatus; and
generate a high-contrast image by applying a trained model to the first medical image, the trained model being obtained by training a model using a medical image as input data and an image having an enhanced contrast in a region of interest of the medical image as ground truth data, the high-contrast image having a contrast higher than a first contrast in the region of interest of the first medical image.

8. The medical image processing apparatus according to claim 7, wherein
the trained model is generated by training a model using
a ground truth data image, the ground truth data image being a high-contrast image generated from a second medical image captured by a second medical image diagnostic apparatus and having a second contrast higher than the first contrast, and
a pseudo second medical image as input data, the pseudo second medical image being generated by performing image processing on the ground truth data image so as to simulate the first medical image.

9. The medical image processing apparatus according to claim 8, wherein the first medical image is a computed tomography image, and the second medical image is a magnetic resonance image or a positron emission tomography image.

10. The medical image processing apparatus according to claim 8, wherein the image processing is processing related to noise addition and contrast reduction performed on the high-contrast image.

11. The medical image processing apparatus according to claim 8, wherein the ground truth image and the pseudo second medical image are simulated images obtained by performing multiple types of image reconstruction processing.

12. The medical image processing apparatus according to claim 8, wherein the first contrast and the second contrast are contrasts between tissues included in the region of interest.

\* \* \* \* \*